July 12, 1960 W. I. SENGER 2,944,424
STROBOSCOPIC DETERMINATION OF ANGLE OF
UNBALANCE IN ROTARY WORKPIECES
Filed Nov. 12, 1954 2 Sheets-Sheet 2

INVENTOR.
Werner I. Senger
BY *Andrus & Scealea*
ATTORNEYS.

United States Patent Office 2,944,424
Patented July 12, 1960

2,944,424

STROBOSCOPIC DETERMINATION OF ANGLE OF UNBALANCE IN ROTARY WORKPIECES

Werner I. Senger, Madison, Wis.

Filed Nov. 12, 1954, Ser. No. 468,397

8 Claims. (Cl. 73—466)

This invention relates to stroboscopic determination of angle of unbalance in rotary workpieces.

Heretofore in balancing machines employing a stroboscope for determining the angular location of unbalance relative to the axis of a rotating workpiece, the determination depended solely upon a visual reading of a stroboscope signal during rotation of the workpiece as related to a circumferential scale on the workpiece or on a member rotating therewith so that the operator could thereafter locate the unbalance in the workpiece with reference to the scale, for correction purposes.

No matter how skilled the operator may be in employing such machines there is always some error in making the visual readings, and such errors are accentuated in case of fatigue or eyestrain or of varying conditions of health or nerves. This difficulty becomes more important as the unbalance tolerances become lower, as for pieces operating at higher rotational speeds. Most operators have difficulty in locating the angle of unbalance within tolerance limits closer than about five degrees of accuracy.

Attempts to solve the problem heretofore by electronic means have been costly and have increased the chances for error through improperly functioning tubes.

The present invention employs the simple stroboscope principle and eliminates the manual or visual reading by substituting therefor a light sensitive reading that is automatic in angle determination.

In carrying out the invention the automatic reader in the form of a light sensitive pick-up means such as a photo-electric cell or the like is made to pick up the stroboscopic light signal only when the unbalance in the workpiece bears a given angular relationship to the beam of light passing to the reader.

In practice the beam of light may be radial of the rotating axis of the workpiece or it may be a reflected beam as will be explained hereinafter.

Either the light source or the light receiver, or both are moved relative to the axis of rotation of the workpiece until the light beam which is generated in synchronism with an unbalance movement of the workpiece registers with the receiver or reader. Thereafter upon stopping of the workpiece it is turned either manually or by suitable power means until it reaches the position where the light beam registration was obtained, whereby the angular position of unbalance is accurately determined in the workpiece. The accuracy obtainable with the present invention is well within the tolerance limit of one degree.

The accompanying drawings illustrate the invention somewhat schematically in the best mode presently contemplated of carrying out the invention.

The invention may be applied to either static or dynamic balancing and to one or two plane balance correction, and the amount of unbalance may be measured either mechanically or electrically. The workpiece may be mounted for substantially free vibration in a single axial plane as in normal balancing machines employing means to measure unbalanced vibrations in a horizontal plane, or the workpiece may be mounted rigidly as in critical speed balancing machines employing phase shift means for measuring unbalance. Plane separation and the amount of unbalance may be obtained and determined by employing a pivotal cradle, nodal bar, electrical phase shift, electrical network or electrical computing means.

The invention is shown as applied to a machine which employs electro-magnetic vibration pick-up means that measure the amount of unbalance and simultaneously therewith trigger a stroboscopic light source in synchronism with a given point in the vibratory cycle of the workpiece.

Figure 1:
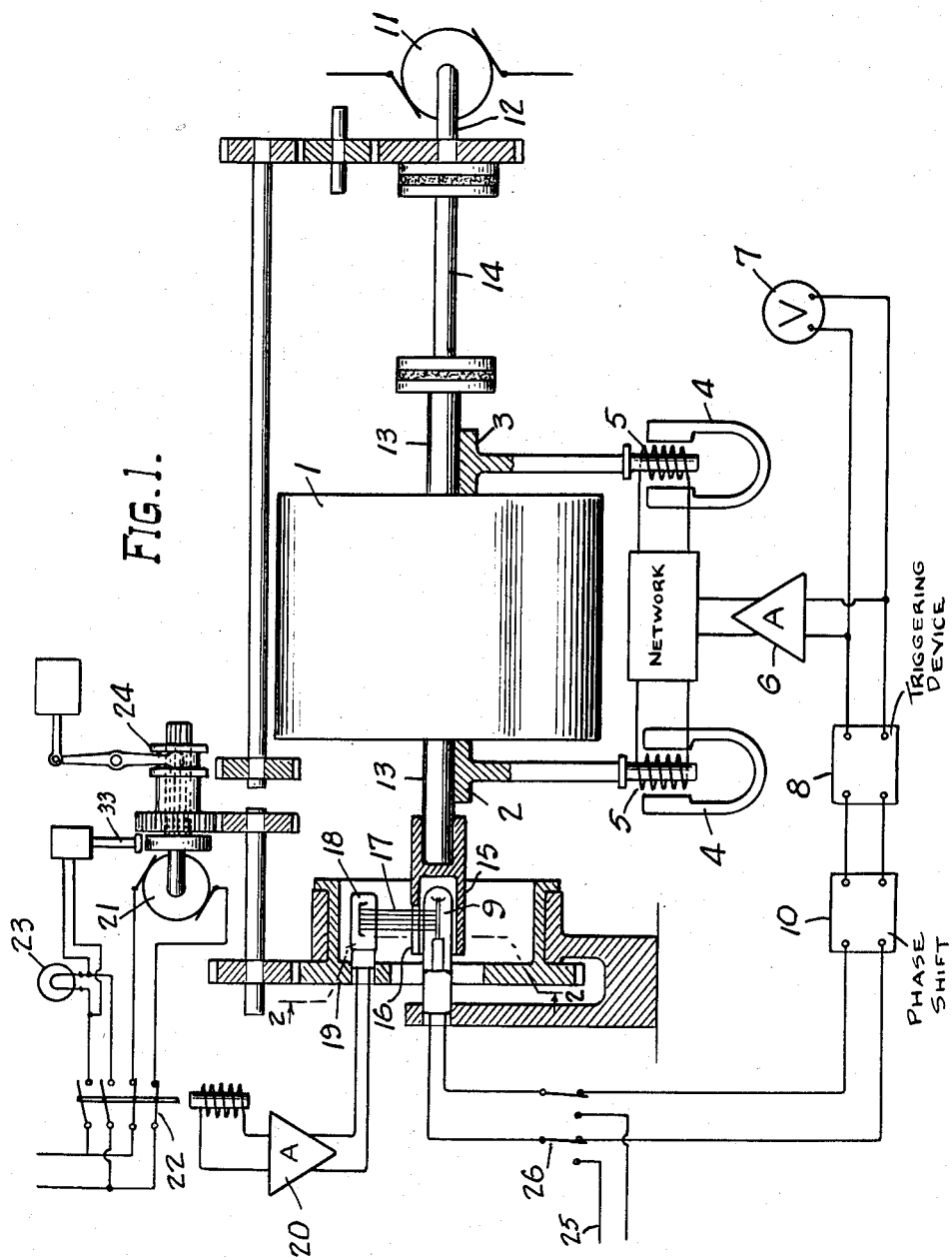
Figure 1 is a schematic showing of an unbalance determining apparatus having the invention incorporated therein.

As shown in Figure 1, the workpiece 1 is mounted for rotation in end bearings 2 and 3 which are supported flexibly to provide for free lateral movement of the workpiece generally in a horizontal plane in response to unbalance vibrations during rotation of the workpiece.

A vibration pick-up device is associated with each bearing 2 and 3, and for illustrative purposes each pick-up device comprises a permanent magnet 4 generally with a gap in its magnetic flux circuit in which a coil 5 is located.

The coil 5 is either supported by or connected to the corresponding bearing 2 or 3 to vibrate therewith and thereby cut magnetic lines of force passing across the gap in magnet 4, to generate electrical current impulses in the coil proportional to and having a fixed phase relation to the vibration resulting from the unbalance in the workpiece. The coils 5 are shown as connected through a suitable electrical network for plane separation to an amplifier 6 which electronically amplifies the current received from the coils and actuates an unbalance amount indicator shown in the drawing as the voltmeter 7. A suitable network for plane separation is shown in the Baker et al. Patent No. 2,165,024.

The current impulses generated in coils 5 and amplified in amplifier 6 are also passed to a triggering device 8 for energizing the stroboscope light source 9 intermittently in synchronism with the vibration of the workpiece 1 effected by its unbalance during rotation. A preferred form of triggering device 8 is one that provides current pulses from the voltage signal induced in coils 5 and thereby momentarily energizes the stroboscope light, as for instance shown in the Baker et al. Patent No. 2,165,024, granted July 4, 1939. For this purpose a phase shift means 10 is interposed between device 8 and the lamp 9.

The workpiece 1 is driven in any suitable manner, that shown in the drawing comprising an electric motor 11 having its shaft 12 coupled to the shaft 13 of the workpiece by a flexible coupling 14 that permits freedom of unbalance vibrations in the workpiece during rotation.

Figure 2:
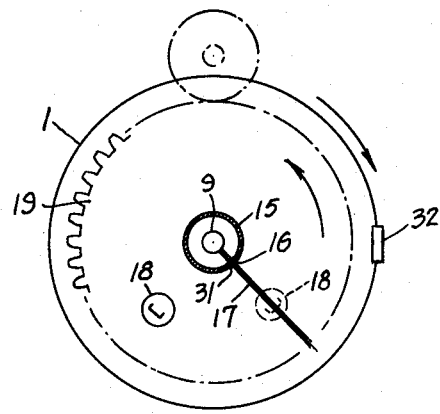
Fig. 2 is a section taken on line 2—2 of Fig. 1, showing the angular adjustment for obtaining registry between the light beam and the photo-electric cell with the dotted position of the latter corresponding to the position of final registry.
Figure 3:
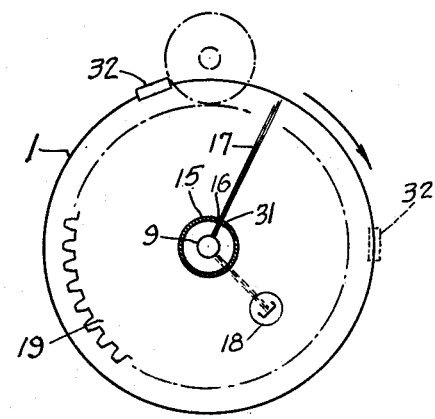
Fig. 3 is a view similar to Fig. 2 showing the angular adjustment for the workpiece after an unbalance measuring operation, with the dotted position of the light beam corresponding to the position of final registry to determine the location of unbalance in the workpiece.

In carrying out the invention as illustrated in Figures 1 to 3 the stroboscope lamp bulb 9 is fixed at and adjacent the end of workpiece shaft 13 opposite coupling 14, and the shaft 13 carries a light shield 15 in the form of a cup which extends over the lamp 9 and serves as a shutter to confine the light emitted from the lamp as shown in Figs. 2 and 3.

The shield 15 is generally cylindrical and has an opening through its wall shown in the form of a longitudinally extending slit 16 which passes a radial beam of light 17 from the light source 9 at the moment of flashing thereof.

Since light source 9 is flashed in a definite relation to the unbalance vibration in workpiece 1, the radial light beam 17 passing through slit 16 bears a definite angular relation to the angular location of unbalance in the workpiece.

For the purpose of reading the stroboscope and recording the angular position of beam 17, a light sensitive pick-up means is employed, shown as a photo-electric cell 18 which is carried by a rotatable support 19 adapted to rotate on the same axis as shaft 13. The cell 18 is disposed at a radial distance outward from the shield 15.

The workpiece 1 may be rotated in either direction, the outer arrows in Figs. 2 to 5 indicating an illustrative direction of rotation. The support 19 may be rotated in either direction, the inner arrows in Figs. 2 and 4 indicating an illustrative direction of rotation.

The support 19 is preferably rotated slowly by a small motor 21 until cell 18 picks up the light beam 17, whereupon the current from amplifier 20 trips a solenoid switch 22 to stop the motor 21 and apply a brake 33 thereto. At the same time switch 22 connects signal lamp 23 to a source of current to indicate the completion of angle determination.

The rotational position of cell 18 at the time of stopping of motor 21 constitutes a register of the angular position of unbalance in the workpiece.

After rotation of the workpiece is stopped, the registered angular position of unbalance can be related to the workpiece, as shown in Fig. 3, by flashing lamp 9 from an external current source and rotating the workpiece slowly in a direction opposite to the direction of the former rotation of support 19 until light beam 17 registers with the photo-electric cell 18 and produces a signal by energizing light 23. For this purpose motor 21 is de-clutched from support 19 by clutch 24 which is actuated to connect motor 21 to drive the shaft 12 of motor 11, thereby slowly turning the workpiece 1 in a direction as indicated by the arrow in Fig. 3, opposite to that of the former rotation of support 19, until beam 17 registers with photo-electric cell 18. During this indexing of the workpiece to the proper angle, the stroboscope lamp 9 is energized from a suitable external source of current 25 which is connected thereto by the double pole switch 26 in the line between the phase shifter 10 and the lamp.

Correction for unbalance may thereupon be made at the proper angle in the workpiece 1 by any suitable means.

The shield 15 may be permanently attached to any member that rotates in synchronism with the workpiece and is shown in the form of a cup removably attached on one end of the shaft 13 of the workpiece. The light beam 17 may flow in either direction, i.e., with the light source 9 either within or external of shield 15 and the pick-up cell 18 either outside or inside the shield. It is more convenient, however, to have the light source within the shield.

Figure 4:
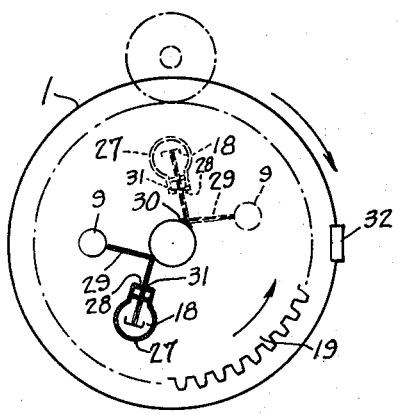
Fig. 4 is a view similar to Fig. 2 showing the employment of a reflected light beam.
Figure 5:
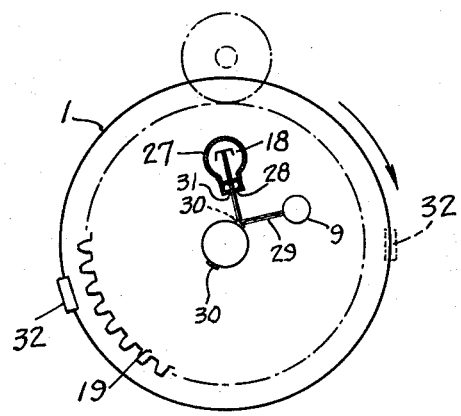
Fig. 5 is a view similar to Fig. 3 showing the employment of the reflected light beam of Fig. 4.

In Figures 4 and 5 the light beam is shown as reflected. In this construction both the light source 9 and the pick-up cell 18 are mounted on support 19 and are adapted to be simultaneously translated about the axis of the workpiece or of a member rotating in synchronism with the workpiece.

The photo-electric cell 18 for this modification is confined in a fixed shield 27 having a slit or opening 28 which transmits thereto only a light beam 29 reflected from the workpiece 1 or other member rotating therewith. The circumferential surface of the workpiece or other member which reflects light beam 29 is made either more reflective or less reflective at a single spot thereon which may be in the form of a dark ink mark 30 on the workpiece, or a light chalk mark.

During rotation of workpiece 1 at high speeds for determining unbalance therein the support 19 is translated slowly around the workpiece until the reflection of flashing beam 29 is altered by mark 30 and the contrast or change in light reflected to cell 18 effects the desired angle determination and thereby stops motor 21 and energizes signal 23.

Thereafter, following stopping of the workpiece, lamp 9 is energized and the workpiece is slowly rotated in a direction opposite to the direction of the former rotation of support 19 until the light beam 29 is altered in the same manner by the mark 30 and signal 23 becomes energized. The position at which the workpiece is stopped gives the means for determining the angle at which the correction for unbalance must be made.

In either embodiment it should be appreciated that either the stroboscope lamp or the photo-electric cell may be shielded. Likewise, in either case the contrast of light received by the photo-electric cell either as a reduced intensity or an increased intensity at the time of initial registry of the elements described is utilized to effect the angle determination.

By employing a direction of rotation of the workpiece 1 during indexing that is the reverse of the former direction of rotation of support 19 it is possible to obtain greater accuracy since the same edge 31 of slot 16 or of slot 28 will be used in indexing as in the original determination. Thus the angle indication is triggered as soon as the first light beam 17 or 29, passing close to edge 31 reaches the photo-electric cell 18. The width of slot 16 or slot 28 is relatively unimportant.

With a reflected beam as in Figs. 4 and 5 the advance edge of spot 30 also becomes important in triggering and the size of the spot or mark is relatively unimportant.

In Figs. 2, 3, 4, and 5 the block 32 on the periphery of the workpiece indicates the unbalance to be located. When in the rotation of the workpiece unbalance 32 reaches the positions indicated in Figs. 2 and 4 the stroboscope lamp 9 is energized. As indicated in these Figs. 2 and 4 the translation of support 19 in the direction of the arrow will bring the photo-electric cell 18 into registry with the light beam 17 or 29, first passing edge 31, as shown in dotted outline.

In Figs. 3 and 5 the workpiece has been stopped with unbalance block 32 at an unknown random location. The workpiece is then rotated in a direction reverse to that of former rotation of support 19 as indicated by the outer arrows until it reaches the location of original triggering with the unbalance block 32 indicated in dotted outline. During the last step of angle determination the support 19 is held stationary. It is also possible to use mechanical stop means for the final indexing operation, such means being set by the original movement of support 19 during angle determination.

The invention is capable of use in either manually operated, semi-automatic, or automatic balancing machines and with either vertical or horizontal work axis, for workpieces which either have their own shaft or are mounted rigidly on a shaft, a spindle of the machine or an arbor, which then becomes the workpiece shaft during operation of the machine. The angle determination may be made in any correlation with other operations and can be carried out simultaneously with the determination of the amount of unbalance.

The angle determination and the subsequent repositioning or indexing of the workpiece in accordance therewith are effected, without introducing inaccuracies from lag, by utilizing a part of the rotating mass of the workpiece including the effective workpiece shaft as an element to which the determining and positioning functions relate. As shown in Fig. 1, the shield 15 with its slot 11 is mounted directly upon the workpiece shaft 13. In Figs. 4 and 5 the mark 30 is on the workpiece shaft or workpiece. The drawings show the other element of the determining means mounted independent of the rotating mass, and it cooperates with said first element in a manner avoiding friction which might introduce errors in the final determination.

Where the correction for unbalance is made while the workpiece is retained in the unbalance measuring machine, the correction device (not shown) should be related to the axial plane of the unbalance vibrations being measured so that the final angular positioning of the work will present the proper side of the work for correction.

Where the correction for unbalance is made at a separate station a similar relationship between the angular positioning of the correction device and the axial plane referred to should be provided, and the workpiece should be transferred from the unbalance measuring machine to the correction station without rotational displacement that would introduce an error in the correction. If a rotational displacement is necessary in the transfer of the workpiece, it should be predetermined in amount and campensated for by the positioning of the correction device.

Various modes of carrying out the invention are contemplated as within the scope of the following claims particularly pointing out and distinctly claiming the subject matter which is regarded as the invention.

I claim:

1. In apparatus for detecting unbalance in a rotating workpiece, a stroboscopic device for determining the angular position for the application of unbalance correction, comprising a light source; means to energize and flash said light source in phase with an unbalance vibration of the rotating workpiece; a light sensitive pick-up means adapted to produce a voltage signal upon a variation in the intensity of light received thereby; means driven in synchronism with the workpiece to effect an abrupt change in light intensity passing to said light sensitive pick-up means when said light source, said driven means and said light sensitive pick-up means register at the moment of flashing of said light source; means to adjust the position of at least one said light source or said light sensitive pick-up means to a point of registry of said driven means with a light beam passing from said light source to said light sensitive pick-up means; and means responsive to the voltage signal from said light sensitive pick-up means to establish the adjustment at the point of registry.

2. In apparatus for detecting unbalance in a rotating workpiece, a stroboscopic device for determining the angular position for the application of unbalance correction, comprising a light source; means to energize and flash said light source in phase with an unbalance vibration of the rotating workpiece; a light sensitive pick-up means adapted to produce a valtage signal upon a variation in the intensity of light received thereby; means driven in synchronism with the workpiece to effect an abrupt change in light intensity passing to said light sensitive pick-up means when said light source, said driven means and said light sensitive pick-up means register at the moment of flashing of said light source; means to adjust the position of at least one said light source or said light sensitive pick-up means to a point of registry of said driven means with a light beam passing from said light source to said light sensitive pick-up means; stop means responsive to the voltage signal from said light sensitive pick-up means to establish the adjustment at the point of registry; and means operative to index said workpiece at the established point of registry whereby the angular location of unbalance therein may be determined.

3. In apparatus for detecting unbalance in a rotating workpiece, a stroboscopic device for determining the angular position for the application of unbalance correction, comprising a light source; means to energize and flash said light source in phase with an unbalance vibration of the rotating workpiece; a light sensitive pick-up means adapted to produce a voltage signal upon an abrupt variation in the intensity of light received thereby; means rotating with the workpiece to effect an abrupt change in light intensity passing to said light sensitive pick-up means when said light source, said rotating means and said light sensitive pick-up means register at the moment of flashing of said light source; means to adjust the position of at least one said light source or said light sensitive pick-up means concentrically with respect to said rotating means to a point of registry of said rotating means with a light beam passing from said light source to said light sensitive pick-up means; stop means responsive to the voltage signal from said light sensitive pick-up means to establish the adjustment at the point of registry; and means operative to reset the workpiece at the established point of registry for said rotating means upon termination of the rotation of said workpiece whereby the angular location of unbalance therein may be determined.

4. The construction of claim 3 in which the rotating means comprises a circular shield surrounding the light source and having an opening therein for the transmission of a beam of light therefrom to said light sensitive pick-up means.

5. The construction of claim 3 in which the rotating means comprises a mark on the outer surface of a member rotating with the workpiece and in which said light source and said light sensitive pick-up means are disposed relative to said member to provide for the reflection of a light beam from said light source to said pick-up means by said member which alters the intensity of said reflected beam at the point of registry of the light beam with the mark.

6. The construction of claim 3 in which said last named means includes means to energize the light source independently of rotation of the workpiece, and utilizes said stop means to establish the point of registry during indexing.

7. In apparatus for determining unbalance in a rotating workpiece, means to determine the magnitude of unbalance in the workpiece by measuring the amplitude of vibration produced during rotation thereof, light means connected to flash in predetermined relation to the phase of peak vibration amplitude, light sensitive means responsive to said light means, one of the latter two means being rotatable about the rotational axis of the workpiece, driven means rotating in synchronism with said workpiece to effect the actuation of said light sensitive means by said light means when one of the latter two means has been rotated to a know positional relationship with said driven means and when said light means flashes, means responsive to said light sensitive means to determine an index position for the workpiece at which the angular location of maximum unbalance in the workpiece is determined, and means thereafter utilizing said light means to index the workpiece to said index position.

8. In apparatus determining unbalance in a rotating workpiece, means to determine the magnitude of unbalance in the workpiece by measuring the amplitude of vibration produced during rotation thereof, light means connected to flash in predetermined relation to the phase of peak vibration amplitude, light sensitive means responsive to said light means, one of the latter two means being rotatable about the rotational axis of the workpiece, driven means rotating in synchronism with said workpiece to effect the actuation of said light sensitive means by said light means when one of the latter two means has been rotated to a known positional relationship with said driven means and when said light means flashes, means responsive to said light sensitive means to determine an index position for the workpiece at which the angular location of maximum unbalance in the workpiece is determined, and means responsive to said last named responsive means and utilizing said light means to thereafter index the workpiece to said determined index position.

References Cited in the file of this patent

UNITED STATES PATENTS

| | | |
|---|---|---|
| 2,165,024 | Baker et al. | July 4, 1939 |
| 2,243,457 | Esval et al. | May 27, 1941 |
| 2,383,588 | Bousky | Aug. 28, 1945 |
| 2,420,765 | Annis | May 20, 1947 |
| 2,451,863 | Oakley | Oct. 19, 1948 |
| 2,486,896 | Weaver et al. | Nov. 1, 1949 |
| 2,524,650 | Cantle | Oct. 3, 1950 |
| 2,616,289 | Kleckner | Nov. 4, 1952 |
| 2,779,217 | Stovall et al. | Jan. 29, 1957 |
| 2,792,725 | Lannen | May 21, 1957 |
| 2,821,858 | King | Feb. 4, 1958 |

FOREIGN PATENTS

| | | |
|---|---|---|
| 574,978 | Germany | Apr. 21, 1933 |
| 710,883 | Germany | Sept. 23, 1941 |